United States Patent [19]

Porter et al.

[11] 3,859,063

[45] Jan. 7, 1975

[54] ENTRAINMENT SEPARATOR

[75] Inventors: Harold F. Porter, Hockessin; Steven I. Taub, Claymont, both of Del.

[73] Assignee: E. I. du Pont de Nemours and Company, Wilmington, Del.

[22] Filed: Apr. 25, 1974

[21] Appl. No.: 463,989

Related U.S. Application Data

[63] Continuation of Ser. No. 387,032, Aug. 9, 1973, abandoned.

[52] U.S. Cl.................... 55/233, 55/337, 55/456, 55/462
[51] Int. Cl............................................ B01d 45/12
[58] Field of Search......... 55/90, 92, 233, 236, 337, 55/392, 456, 457, 462; 261/79 A

[56] References Cited
UNITED STATES PATENTS

| 738,750 | 9/1903 | Anderson | 55/392 |
| 3,370,401 | 2/1968 | Lucas et al. | 55/90 |

Primary Examiner—Bernard Nozick

[57] ABSTRACT

The standard cap of an impingement cap entrainment separator is modified by the installation of fixed spiral vanes in the cap annulus or in the underside of the cap. The spiral vanes cause all of the liquid in the gas stream to be de-entrained and flow downward as a film on the cap skirt. The cap skirt also has a weir to collect the liquid and prevent re-entrainment.

2 Claims, 5 Drawing Figures

PATENTED JAN 7 1975　3,859,063

ENTRAINMENT SEPARATOR

This application is a continuation of Ser. No. 387,032 filed 8/9/73 now abandoned.

BACKGROUND OF THE INVENTION

The impingement cap has been used in various forms in many types of process equipment for separation of liquids from gases. An early example is a "dry" bubble cap tray at the top of a distillation column. Another common application is separation of liquid from vapor at the exit of a calandria in an evaporator. During recent years, simple impingement caps have been employed for reduction of entrained liquid from gas streams, usually as an integral part of an evaporator, scrubber, or other gas-liquid contacting device.

The impingement cap entrainment separator can be converted into an efficient gas-liquid contactor for separation of solids and mists from gases by the use of a pad of knitted mesh in the riser pipe and the spraying of liquid on the upstream side at the mesh. Such a contactor is described in detail in U.S. Pat. No. 3,370,401 to Lucas et al.

In the operation of an impingement cap separator, the small liquid drops experience coalescence into larger drops as a result of their impingement on the cap at relatively high velocity. This results in a reversal of flow, downward, in the annulus between the cap and the riser pipe where further coalescence may occur. The liquid drops are separated as a result of the second reversal of gas flow when the inertial forces acting on a drop are sufficient to overcome the viscous drag forces. Consequently, large particles are more readily separated than smaller ones. As the flow rate of the gas between the outer cap wall and the vessel increases progressively, these particles can fail to separate with consequent decrease in separating efficiency.

The simple cap separator also has another problem. Droplets which form on the lip of the cap as a result of the liquid film which flows down the inner cap wall tend to become re-entrained and leave the device without being separated. This characteristic is also related directly to the velocity in the outer annulus.

While the plain cap separator is an uncomplicated, useful entrainment separator which is capable of handling particulate solid slurries and a wide range of liquid to gas ratios, it is frequently found that the cross-sectional area of the separator vessel required to achieve desired separating efficiency is larger than the column or process vessel in which it is to be installed. This necessitates either increasing the area of the entrainment portion of the vessel or using a larger process vessel than would otherwise be required to conduct the proceeding operation.

SUMMARY OF THE INVENTION

We have discovered that the efficiency of an impingement cap separator can be markedly improved if all the droplets from the gas stream are induced to flow as a film on the inner surface of the cap skirt wall rather than as a dispersion in the gas stream. This can be readily accomplished by installation of fixed spiral vanes intermediate the riser pipe and cylindrical cap skirt in either the upper portion of the cap annulus or on the underside of the cap. These vanes impart a swirling motion or spin to the gas as it passes down the inner cap annulus. The resulting centrifugal force readily removes substantially all of the entrained liquid droplets outwardly from the main gas flow to the inner surface of the cap skirt wall where they tend to form a film which flows downwardly along the wall. At the lower end of the cap skirt wall is located a collecting weir having suitable drain passages for discharging the de-entrained liquid from the vessel.

The above-described device not only achieves more effective de-entrainment of liquids but also minimizes reentrainment of removed liquids. With these improvements, it is possible to achieve separating efficiencies not possible with the simple cap and to reduce greatly the physical size of the separator vessel, thereby making it more completely compatible with performance of the process equipment with which it is associated.

The separator of the invention can readily be used as a separate unit or it can be incorporated into almost all types of process equipment, e.g., distillation columns, reactors, scrubbers, particularly those used with incinerators, condensors, crystallizers, etc. Thus, when it is so incorporated, the capacity of associated process equipment can often be increased. It can handle large or small amounts of entrained liquid and provide essentially complete separation. It can handle most types of gas streams, i.e., it does not become plugged if the entrainment is a heavy slurry of particulate solids, tar, or the like. It can also be used to break down foamy liquids with simultaneous disengagement of the gas.

DESCRIPTION OF THE INVENTION

Figure 1:
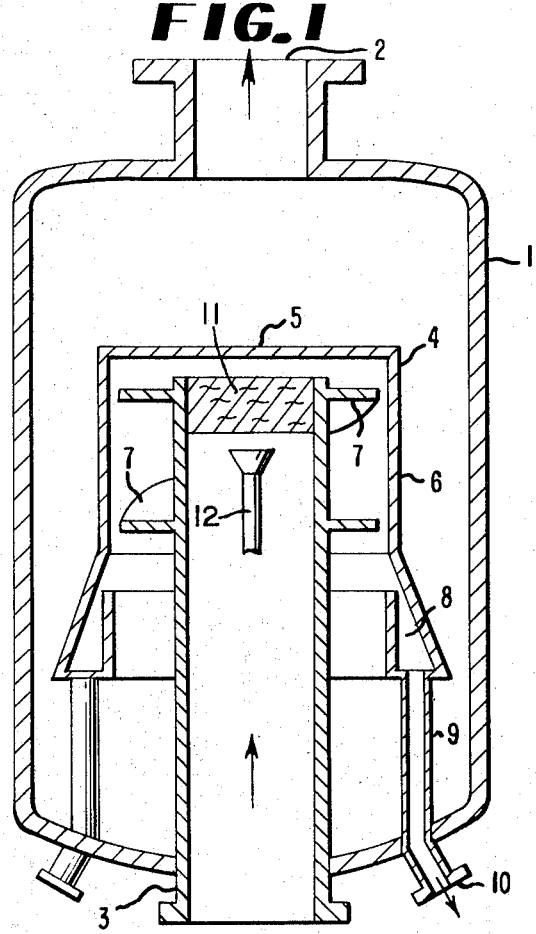
FIG. 1 is a cross-sectional view of an embodiment of the improved entrainment separator of the invention.

A self-contained entrainment separator unit is illustrated in FIG. 1. In this embodiment of the invention, a vertical vessel 1 is provided with a clean gas outlet 2 at its upper end. A concentrically disposed riser pipe 3 enters the vessel at its lower end. Entrainment-laden gas enters through this riser.

In this embodiment, the clean gas leaves the vessel at its upper end. If desirable, the clean gas can be exited at the bottom of the vessel. This is possible under many conditions wherein the separator will provide sufficient separation without the requirement that the gas stream has a second reversal in direction. This alternative embodiment has the advantage of reducing the size of the vessel required.

Disposed concentrically at a distance of about ¼ to one riser diameters from the upper end of the riser is a cylindrical cap 4. The top 5 of cap 4 is located a suitable distance below the top of the vessel to avoid undue restriction of gas flow. The cap is composed of a cap top 5 and skirt 6. The cylindrical length of the skirt can range from one to four riser diameters. The bottom of the skirt 6 is flared to form a collecting weir 8. The inside diameter of the cylindrical weir wall is usually the same diameter as the cap skirt 6. Spaced at intervals around the weir are downcomers 9 which serve to drain the liquid collected in the weir and deliver the de-entrained liquid or particulate slurry, as the case may be, to one or more outlets 10 on or near the bottom of vessel 1. If desired, the downcomers can extend outside the vessel to eliminate any liquid/gas interface at the bottom of the vessel.

On the outer wall of the riser 3 and extending into the annulus between riser 3 and skirt 6 are spiral vanes 7. The vanes can be attached either to the riser or skirt. Normally, the vanes do not extend beyond the bottom of skirt 5 or above the top of riser 3, although there is no definite restriction in this regard.

Figure 4:
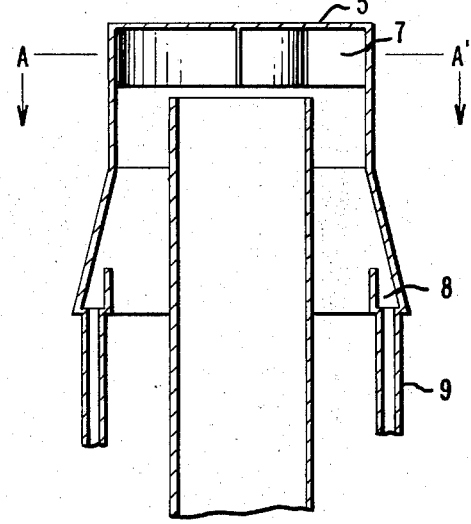
FIG. 4 is a cross section of an embodiment of the invention employing vanes in the underside of the cap.
Figure 5:
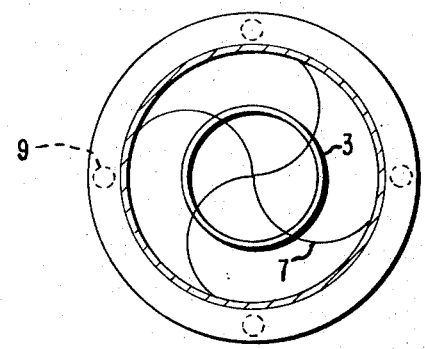
FIG. 5 is a cross-sectional view taken along A—A' of FIG. 4.

Another method for imparting swirl to the gas stream consists of installing spiral vanes on the underside of cap top 6 as illustrated in FIGS. 4 and 5.

If desired, the discharge end of the riser can contain a plug of a fibrous bed structure such as described in U.S. Pat. No. 3,370,401. If such a fibrous bed structure is employed, scrubbing-liquid spray nozzles are also necessary upstream from the fibrous bed as disclosed in U.S. Pat. No. 3,370,401. The nozzle will discharge a liquid evenly across the cross section of the riser.

The fibrous bed structure can be fabricated from fibers having diameters in the range of about 0.5 to 16 mils. It can have a packing density of about 1–20 lbs/ft$^3$, a void fraction in the range of about 0.8 to 0.99, and a specific surface of about 50 ft$^2$/ft$^3$ or greater.

In operation after the entering gas stream has been impinged on the underside of the cap top 5, the gas stream is turned downward into annulus between the riser 3 and the cap skirt 6. As the gas stream passes through the spiral vanes 7 in this annulus or in the underside of the cap as illustrated in FIG. 4, the gas is swirled and the liquid de-entrained by the resulting centrifugal force. The liquid forms a film on the cap skirt 6 and passes downward into the weir 8. The weir collects the liquid; if the weir were not present, there could be a certain amount of re-entrainment of the liquid as a result of the liquid droplets being sheared from the lip of the cap skirt by the gas stream as it reverses direction and flows toward the clear gas exit 2. Any water droplets not collected by the weir are moving out of the riser to cap skirt annulus at such a velocity that they are directed downward and collect at the bottom of the vessel.

The design of the spiral vanes is not critical with respect to their entrainment-removal function. However, the design must be such that sufficient centrifugal force is developed to transport the smallest particles involved to the inner wall of the cap skirt 6 without creating excessive pressure drop. Thus, in designing the spiral vanes, consideration must be given to the properties of the particles present in the gas stream and the pressure drop which can be tolerated across the separator. In general, the more revolutions per foot of vanes, the greater the centrifugal force, the higher the pressure drop, and the better the particulate removal.

Figure 3:
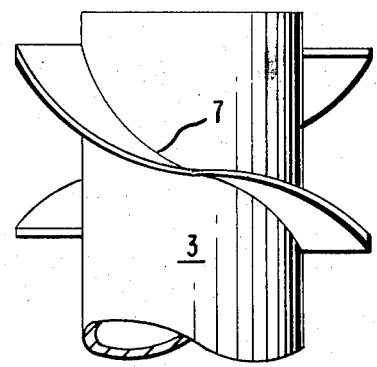
FIG. 3 is a view of a riser pipe having spiral vanes of a different pitch.
Figure 2:
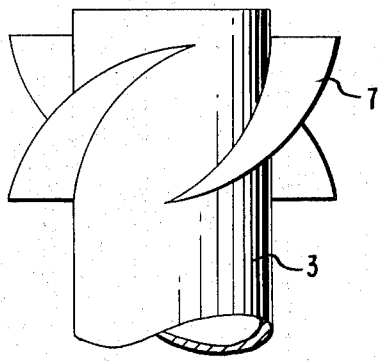
FIG. 2 is a view of a riser pipe having spiral vanes.

In FIG. 2 a spiral vane is illustrated wherein there is ¼ turn in a length equal to the riser diameter. In FIG. 3, the vane has ½ turn in the same length. In operation, the vanes of FIG. 3 would provide better particulate removal but a higher pressure drop.

The following relative proportions of equipment have been found to be effective, it being understood that these limits are not critical and that the individual dimensions can, in fact, be varied widely without seriously affecting its performance. The cross-sectional area of the cap will usually be two to four times the area of the riser. The cross-sectional area of the vessel 1 need not be greater than that required to provide an annular space between the cap weir and vessel wall which is not unduly restrictive to gas flow. Clearance of the bottom of the weir 8 above the bottom of the vessel is normally of the order of one to three riser diameters. The gap between the cap skirt and the end of the spiral vanes is not critical.

In operation, the incoming gas rates can vary widely, and the separator of the invention can be designed to handle almost any rate. The amount of liquid entrainment can also vary over a wide range; it also is essentially unlimited with proper design. The unit, when combined with a fibrous bed structure in the riser, is particularly useful for removing solid or liquid particulates, down to fractional micron sizes.

Furthermore, the temperature and pressure of the incoming gas are not critical, and the unit can operate over the wide ranges, depending upon the design and materials of construction.

To exemplify the separator of the invention, the following tests were conducted in a pilot unit employing a riser 3 having an outside diameter of 4.562 inches and an inside diameter of 4.0 inches. The riser extended 16 inches into the vessel, which vessel had an overall length of 24 inches and an inside diameter of 11.5 inches. The discharge end of the riser contained a fibrous bed structure knitted from 11 mil wire with a packing density of 14.4 lb/cu ft with a void fraction of 0.970. The length of the fibrous structure was 4.0 inches. The cap 4 was 7 inches inside diameter and the skirt was 8¾ inches long. The skirt was flared to a diameter of 8.5 inches with a collecting weir at the bottom and the weir was drained by two ½-inch diameter downcomers. A full cone spray directed upward toward the mesh was installed in the riser pipe.

Various tests were conducted with a gas velocity in the riser of 58 ft/second and a water rate to the spray of 2.8 gallons/minute.

Three spiral vanes having different angular acceleration rates were tested. Spiral A had 4 vanes each having a pitch of 16 inches per revolution, i.e., the gas travels one complete revolution in a lineal distance of 16 inches. Spiral B contained two vanes with a pitch of 8 inches per revolution, and Spiral C was composed of two vanes with a pitch of 4 inches per revolution. The total length of the spiral assembly in each case was four inches and the top of the assembly was positioned two inches below the top of the riser pipe. Increase in pressure drop across the unit resulting from addition of the spiral assemblies was: Spiral A—1 inch water gauge; Spiral B—4 inches water gauge; and Spiral C—16 inches water gauge.

When the clean gas exiting the separator unit was checked for entrainment, the results indicated that in each case the entrainment was less than 0.005 grains per cubic foot of gas—0.005 grains per cu ft being the lower limit of measurement capability of the facilities available. Tests conducted with the simple design of cap separator without the spiral vanes and weir, using a riser velocity of 58 ft/sec and 2.8 gallons/minute of spray water resulted in exit gas containing at least 0.05 grains of entrained water per cubic foot of gas and in some cases over 0.5 grains per cu ft.

With respect to particulate removal, the calculated cut size for Spiral A was 20 to 25 microns, 18 microns for Spiral B, and 10 microns for Spiral C. In this case the results indicate that essentially all of the particulates, after impingement on the cap, were larger than 25 microns.

We claim:

1. An entrainment separator comprising in combination a vessel fitted at the bottom with an upwardly directed riser pipe for discharging entraining gas within said vessel, impingement cap means comprising an impervious cap top disposed above the discharge end of said riser and a cylindrical cap skirt surrounding the upper portion of said riser, thereby creating an annulus between the riser and the cap skirt, said cap means acting to redirect the gas flowing through said riser pipe in a direction sharply away from the direction the gas had taken while passing through said riser pipe, extending intermediate the riser pipe and cylindrical cap skirt, a fixed spiral vane for imparting a swirling motion to the gas flowing through said annulus, thereby removing the entrained liquid from the gas by centrifugal force, weir collector means located at the bottom of said cap skirt and below said spiral vane for collecting the de-entrained liquid, drain means for removing the liquid from the weir and discharging the de-entrained liquid from the vessel and a clean gas outlet.

2. The apparatus of claim 1 wherein a fibrous bed structure is disposed transverse the open discharge end of said riser pipe, and said riser pipe is provided with a scrubbing liquid spray nozzle for discharging liquid substantially evenly across the cross section of said riser pipe upstream from said fibrous structure.

* * * * *